US007247023B2

(12) United States Patent
Peplinski et al.

(10) Patent No.: US 7,247,023 B2
(45) Date of Patent: Jul. 24, 2007

(54) SYSTEM AND METHOD FOR MONITORING WEIGHT AND NUTRITION

(76) Inventors: Daniel M. Peplinski, 1700 Shaker Blvd., Okemos, MI (US) 48864; Alan Utter, 155 Teaberry Dr., Boone, NC (US) 28607; David Neiman, 312 Ivy Hill Rd., Weaverville, NC (US) 28787

( * ) Notice: Subject to any disclaimer, the term of this patent is extended or adjusted under 35 U.S.C. 154(b) by 513 days.

(21) Appl. No.: 10/355,195

(22) Filed: Jan. 31, 2003

(65) Prior Publication Data

US 2004/0002041 A1   Jan. 1, 2004

Related U.S. Application Data

(60) Provisional application No. 60/391,587, filed on Jun. 27, 2002.

(51) Int. Cl.
    *G09B 19/00*    (2006.01)
(52) U.S. Cl. .................. 434/127; 434/238; 434/365; 600/300; 128/921
(58) Field of Classification Search ............... 434/127, 434/238, 365; 705/1–3; 482/9; 600/300; 128/920, 921
    See application file for complete search history.

(56) References Cited

U.S. PATENT DOCUMENTS

| 4,895,163 | A | * | 1/1990 | Libke et al. ............... 600/547 |
|---|---|---|---|---|
| 4,951,197 | A |   | 8/1990 | Mellinger |
| 5,673,691 | A | * | 10/1997 | Abrams et al. ............ 600/300 |
| 5,796,640 | A | * | 8/1998 | Sugarman et al. ......... 708/132 |
| 5,839,901 | A |   | 11/1998 | Karkanen |
| 5,937,387 | A |   | 8/1999 | Summerell et al. |
| 5,941,825 | A | * | 8/1999 | Lang et al. ................. 600/449 |
| 5,954,640 | A |   | 9/1999 | Szabo |
| 6,270,455 | B1 | * | 8/2001 | Brown ....................... 600/300 |
| 6,334,824 | B1 | * | 1/2002 | Filice et al. ................ 473/566 |
| 6,336,136 | B1 | * | 1/2002 | Harris ........................ 709/219 |
| 6,368,272 | B1 |   | 4/2002 | Porumbescu |
| 6,538,215 | B2 | * | 3/2003 | Montagnino et al. ..... 177/25.16 |
| 2002/0026111 | A1 | * | 2/2002 | Ackerman .................. 600/347 |
| 2002/0062069 | A1 | * | 5/2002 | Mault ........................ 600/300 |
| 2002/0107433 | A1 | * | 8/2002 | Mault ........................ 600/300 |
| 2002/0133378 | A1 | * | 9/2002 | Mault et al. ................... 705/3 |
| 2003/0027688 | A1 | * | 2/2003 | Gordon et al. ................ 482/9 |
| 2003/0130595 | A1 | * | 7/2003 | Mault ........................ 600/567 |
| 2003/0186202 | A1 | * | 10/2003 | Isenberg .................... 434/236 |
| 2003/0187683 | A1 | * | 10/2003 | Kirchhoff et al. ............. 705/1 |
| 2003/0204412 | A1 | * | 10/2003 | Brier ............................. 705/2 |

(Continued)

OTHER PUBLICATIONS

Dick et al. Wrestling with Weight Loss: The NCAA Wrestling Weight Management Policy [online], Jan. 15, 1998 [retrieved on Apr. 13, 2004]. Retrieved from the Internet: <URL: http://ncaa.org/library/sports_sciences/wrestling_with_weight_loss.pdf>.*

(Continued)

*Primary Examiner*—Joe H. Cheng

(57) ABSTRACT

A website provides a weight and nutritional program over a network. The website allows users to input an assessment of a subject, which can be used to generate a weight plan for the subject. The weight plan can include minimum weights for the subject, each of the minimum weights being associated with a time. The website can also be used to generate a nutrition plan based on the subject data entered. A subject can build the nutrition plan by responding to a series of food exchange item prompts.

19 Claims, 29 Drawing Sheets

U.S. PATENT DOCUMENTS

2003/0225731 A1* 12/2003 Vidgen ............................ 707/1
2003/0226695 A1* 12/2003 Mault ........................ 177/25.16
2004/0035611 A1*  2/2004 Honda et al. ............ 177/25.19

OTHER PUBLICATIONS

Weight Management in Athletes Outline What behaviors do athletes use to lose weight? [online], Apr. 1998 [retrieved on Apr. 14, 2004]. Retrieved from the Internet:<URL: http://northonline.sccd.ctc.edu/nwacsm/NWACSM-weight%20&%20athletesB&W.pdf>.*

NWCA Wrestling Weight Certification Forms (.

Perriello, Jr., MD, Vito A. Aiming for healthy weight in wrestlers and other athletes. Contemporary Pediatrics Archive. Sep. 2001.

NWCA Wrestling Weight Certification Forms, before Jun. 27, 2002.

* cited by examiner

NCAA Wrestling Weight Certification Section I
2002-03 Initial Assessment to Determine Minimum Wrestling Weight Name of Student-Athlete (first, initial, last): Jack | J | Sprat     Click to add Female wrestler.

Institution: NWCA     Division: I ⦿   II ○   III ○   NAIA ○   NJCAA ○   CaCC ○

Years In College: 1 ○   2 ⦿   3 ○   4 ○   5 ○     Final Weight Class Wrestled Previous Season (H.S. or College): 195

Date Of Birth: 10-29-83     Gender: Male

LOWEST ALLOWABLE WEIGHT - ONE (LAW 1)

STEP 1. HYDRATED BODY WEIGHT (BW)

| | Time 1 ($T_1$) | Time 2 (24 hrs after $T_1$) (If T1 SG > 1.020) | Time 3 (24 hrs after $T_2$) (If T2 SG > 1.020) |
|---|---|---|---|
| Date: | 8-12-02 | | |
| Specific Gravity (CG) (Must be ≤ 1.020) | .89 | | |

Hydrated Body Weight (BW) (Recorded to tenth of a pound, no rounding.)     BW = 200

Step 2. BODY DENSITY (BD) Calculate body density by either SKIN-FOLD or HYDROSTATIC WEIGHING technique

| SKIN-FOLD MEASUREMENTS (To the nearest half of a millimeter) | | | | | | HYDROSTATIC WEIGHING (Direct measure of residual volume (RV) required.) |
|---|---|---|---|---|---|---|
| | Test 1 | Test 2 | Test 3 | Median Value | | |
| Triceps (T) | 18 | 14 | 16 | 16 | | Provide as an attachment to this form. |
| Subscapular (S) | 12 | 10 | 11 | 11 | OR | -RV measurement technique<br>-RV raw data & calculations |
| Abdominal (A) | 15 | 13 | 12 | 13 | | -Underwater weighing raw data<br>-Calculation of body density |

Median(T) + Median(S) + Median(A) = Sum Skin-Folds (SUM SF) = 40

BD = [1.0982 - ((SUM SF) * .0008815)] + [(SUM SF)² * (.00000084)]

BD = 1.06694400000000

Step 3. Percentage of Body Fat (%BF) = [(4.57/BD)-4.142]*100     %BF = 14.1261352048466

Step 4. Fat Weight (FW) = Body Weight(BW)*(%BF/100)     FW = 28.2522704096993

Step 5. Fat Free Weight (FFW) = Body Weight(BW)-Fat Weight(FW)     FFW = 171.7477295903C

Step 6. Lowest Allowable Weight-One (LAW 1) = Fat Free Weight(FFW)/0.95 (≥ 0.5, round to the next pound)     LAW 1 = 175

LOWEST ALLOWABLE WEIGHT - TWO (LAW 2)

Step 7. Determine # of weeks b/w initial assessment & Dec. 16th deadline (Nov 15 for CA Jr Colleges)     # of weeks 16

Step 8. Lowest Allowable Weight-Two (LAW2) = BW - (.015 * # of weeks * BW)     LAW 2 = 152

Step 9. Minimum Wrestling Weight (MWW).

Select the HIGHER of these two values (LAW1 & LAW2). This becomes the student-athletes MWW     MWW = 183

THERE IS NO EVIDENCE, SCIENTIFIC OR OTHERWISE, THAT THE MINIMAL WRESTLING WEIGHT IS THE OPTIMAL WEIGHT FOR WRESTLING PERFORMANCE.

CERTIFICATION

We have reviewed and comprehend the NCAA principles governing proper weight management. We certify that the skin-fold/hydrostatic weighing, body density, % body fat, and minimum wrestling weight are calculated in accordance with the enclosed instructions. We certify that the athlete will achieve any weight loss at a rate not to exceed 1.5% of original hydrated body weight per week.

Signatures Required

Student Athlete: _____ Athletic Administrator: _____

☐ STUDENT-ATHLETE: I verify that the coach and/or athletics trainer has reviewed the NCAA weight management rules handout and rules video information during the pre-season meeting.

Athletic Trainer: _____ Head Wrestling Coach: _____
Person performing above tests if not athletic trainer: _____ Title: _____

This form must be completed no later than the first official practice. Please send this form and the accompanying Weight Loss Plan form to Randy L. Buhr, NCAA Wrestling Staff Liason, after making file copies for the appropriate individuals at your institution, no later than the first official practice. No faxes will be accepted.

FIG. 2C

NCAA Wrestling Weight Certification Section II

Completed Prior to First Competition at Certified Weight (No later than December 16, 2002)

Note: This form must only be completed by student athletes appearing on institutional squads for the first time and who have not been previously through the NCAA Wrestling Weight Certification Progam Name of Student-Athlete: pat tocci
Institution: NWCA
Division: 1
Years In College: 5
Final Weight Class Wrestled Previous Season (H.S. or College): 133
Date Of Birth: 5/15/1961

DESIGNATED WEIGHT CLASS

STEP 1. HYDRATED BODY WEIGHT (BW)

| | Time 1 ($T_1$) | Time 2 (24 hrs after $T_1$) (If T1 SG > 1.020) | Time 3 (24 hrs after $T_2$) (If T2 SG > 1.020) |
|---|---|---|---|
| Date: | | | |
| Specific Gravity (CG) (Must be ≤ 1.020) | 0.000 | 0.000 | 0.000 |
| Hydrated Body Weight (BW) (Recorded to tenth of a pound. No rounding.) | | BW = | |

DESIGNATED WEIGHT CLASS FOR 2002-03 SEASON =

VOLUNTARY BODY COMPOSITION

Step 2. BODY DENSITY (BD) Calculate body density by either SKIN-FOLD or HYDROSTATIC WEIGHING technique

SKIN-FOLD MEASUREMENTS
(To the nearest half of a millimeter)

| | Test 1 | Test 2 | Test 3 | Median Value |
|---|---|---|---|---|
| Triceps (T) | 0.0 | 0.0 | 0.0 | 0.0 |
| Subscapular (S) | 0.0 | 0.0 | 0.0 | 0.0 |
| Abdominal (A) | 0.0 | 0.0 | 0.0 | 0.0 |

Median(T) + Median(S) + Median(A) = Sum Skin-Folds (SUM SF) = 0.0000

BD = [1.0982 - ((SUM SF) * .000815)] + [(SUM SF)$^2$ * (.00000084)]

OR

HYDROSTATIC WEIGHING
(Direct measure of residual volume (RV) required.)

Provide as an attachment to this form.
-RV measurement technique
-RV raw data & calculations
-Underwater weighing raw data
-Calculation of body density

BD =

Step 3. Percentage of Body Fat (%BF) =[(4.57/BD)-4.142]*100

%BF =

*For research purposes only.

CERTIFICATION -

We have reviewed and comprehend the NCAA principles governing proper weight management. We certify that the skin-fold/hydrostatic weighing, body density, % body fat, and minimum wrestling weight are calculated in accordance with the enclosed instructions. We certify that the athlete will achieved any weight loss at a rate not exceeding 1.5% or original body weight per week.

Signatures Required

Student Athlete:_____ Athletic Administrator:_____

Athletic Trainer:_____ Head Wrestling Coach:_____

Person performing above tests if not athletic trainer:_____ Title:_____

This form must be on file at the NCAA national office postmarked no later than December 16, 2002. Please send original to Randy L. Buhr, NCAA Wrestling Staff Liason, after making file copies for the appropriate individuals at your institution. No faxes will be accepted.

Note: This form MUST be printed, signed and mailed to the appropriate office. It is NOT transmitted to the NCAA office directly via this web site. Please use the 'Printable Cert' button below to generate a printed certification.

*FIG. 2D*

2002-2003 Squad List Summary Report

Institution: NWCA

| Name | Date of Section I Assessment | Specific Gravity | Original Hydrated Body Weight (BW) | Lowest Allow. Weight No. 1 (LAW-1) | Lowest Allow. Weight No. 2 (LAW-2) | Minimum Wrestling Weight (MMW) | Date of Section II Certification | Certified Weight Class |
|---|---|---|---|---|---|---|---|---|
| Josh crawford | 8/27/2002 | 1.006 | 201.2 | 171 | 153 | 171 | | |
| mike harrington | 9/15/2002 | 1.020 | 160.0 | 148 | 122 | 148 | | |
| mike jeffrey | 9/6/2002 | 1.020 | 175.4 | 154 | 133 | 154 | 11/25/2002 | 157 |
| Charles Moore | 9/14/2002 | 1.020 | 185.5 | 166 | 147 | 166 | | |
| Charles Moore | 9/14/2002 | 1.020 | 185.0 | 165 | 146 | 165 | | |
| dave moyer | 9/5/2002 | 1.020 | 205.5 | 178 | 156 | 178 | | |
| mat moyer | 9/6/2002 | 1.020 | 179.6 | 155 | 136 | 155 | | |
| rory o'neil | 9/10/2002 | 1.001 | 183.3 | 167 | 139 | 167 | | |
| nick schmitt | 9/25/2002 | 1.015 | 150.2 | 140 | 128 | 140 | | |
| pat tocci | 9/5/2002 | 1.020 | 158.5 | 143 | 120 | 143 | | |
| mike utter | 9/5/2002 | 1.020 | 175.0 | 154 | 133 | 154 | | |
| mike utter | 9/5/2002 | 1.020 | 175.4 | 155 | 133 | 155 | | |
| mike utter | 9/5/2002 | 1.020 | 175.4 | 155 | 133 | 155 | | |
| james Winter | 11/18/2002 | 1.005 | 258.0 | 196 | 258 | 258 | | |

*FIG. 2E*

NCAA Wrestling Weight Certification
WEIGHT LOSS PLAN

*Please circle applicable option:*   ONE CERTIFICATION (see Rule 3-1-c)   TWO CERTIFICATIONS (see Rule 3-1-b)

This form is to be used to project premissible weight loss and the first date for the student-athlete to compete at the minimum wrestling weight class. There is no evidence, scientific or otherwise, that the minimal wrestling weight is the optimal weight for wrestling performance.

One or Two Certifications: The student-athlete has the time between the initial weight assessment and December 16, 2002 to modify his or her weight in a controlled manner, so long as he or she does not allow on average more than 1.5% of the original body weight to be lost in a given week over the weight-loss period and does not go below his or her minimum wrestling weight (MWW).

Wrestler - School: Josh crawford - NWCA
Hydrated Body Weight at initial assessment: BW= 201.2   Maximum Weight loss per week (.015 x BW) = 3.018

| DATE | | PROJECTED | ACTUAL |
|---|---|---|---|
| 8/27/2002 | Initial Assessment | | |
| 9/3/2002 | Week 1 [BW-(Max. Weight Loss*1)] | 198.18 | |
| 9/10/2002 | Week 2 [BW-(Max. Weight Loss*2)] | 195.16 | |
| 9/17/2002 | Week 3 [BW-(Max. Weight Loss*3)] | 192.15 | |
| 9/24/2002 | Week 4 [BW-(Max. Weight Loss*4)] | 189.13 | |
| 10/1/2002 | Week 5 [BW-(Max. Weight Loss*5)] | 186.11 | |
| 10/8/2002 | Week 6 [BW-(Max. Weight Loss*6)] | 183.09 | |
| 10/15/2002 | Week 7 [BW-(Max. Weight Loss*7)] | 180.07 | |
| 10/22/2002 | Week 8 [BW-(Max. Weight Loss*8)] | 177.06 | |
| 10/29/2002 | Week 9 [BW-(Max. Weight Loss*9)] | 174.04 | |
| 11/5/2002 | Week 10 [BW-(Max. Weight Loss*10)] | 171.02 | |
| 11/12/2002 | Week 11 [BW-(Max. Weight Loss*11)] | 171.00 | |
| 11/19/2002 | Week 12 [BW-(Max. Weight Loss*12)] | 171.00 | |
| 11/26/2002 | Week 13 [BW-(Max. Weight Loss*13)] | 171.00 | |
| 12/3/2002 | Week 14 [BW-(Max. Weight Loss*14)] | 171.00 | |

CERTIFICATION

We have reviewed and comprehend the NCAA principles governing proper weight management. We certify that the skin-fold/hydrostatic weighing, body density, % body fat, and minimum wrestling weight are calculated in accordance with the enclosed instructions. We certify that the athlete will achieve any weight loss at a rate not to exceed 1.5% of original hydrated body weight per week.

Signatures Required
Student Athlete:_____   Athletic Administrator:_____
Athletic Trainer:_____   Head Wrestling Coach:_____

This form must be returned to the NCAA National Office along with the Section I Certification Form. This form is to be used by institutional sports medicine staff and the student-athlete each week to ensure compliance with NCAA weight management guidelines. Each institution should also keep a copy of this form on file.

*FIG. 2F*

NWCA Wrestling Weight Certification
Wrestler Access Report
Date: 12/18/2002

School: NWCA
PO Box 54
Manhiem, PA 17545

Wrestling coaches: Share the Login ID and Password with each individual wrestler to allow access to Diet Program.

| WRESTLER NAME | Alpha Date | Alpha Weight | Login ID | Login Password |
|---|---|---|---|---|
| crawford, Josh | 9/5/2002 | 201.2 | 0001-01 | ajc1410 |
| harrington, mike | 9/5/2002 | 160.0 | 0001-02 | rmh1305 |
| jeffrey, mike | 9/6/2002 | 175.4 | 0001-06 | fmj0001 |
| Moore, Charles | 9/14/2002 | 185.5 | 0001-12 | ocm5444 |
| Moore, Charles | 9/14/2002 | 185.0 | 0001-11 | ocm6417 |
| moyer, dave | 9/7/2002 | 205.5 | 0001-08 | ydm8825 |
| moyer, mat | 9/7/2002 | 179.6 | 0001-09 | ymm8107 |
| o'neil, rory | 9/10/2002 | 183.3 | 0001-10 | nro7304 |
| schmitt, nick | 9/25/2002 | 150.2 | 0001-13 | hns4388 |
| tocci, pat | 9/6/2002 | 158.5 | 0001-07 | cpt9456 |
| utter, mike | 9/6/2002 | 175.0 | 0001-03 | tmu1112 |
| utter, mike | 9/6/2002 | 175.4 | 0001-04 | tmu0829 |
| utter, mike | 9/6/2002 | 175.4 | 0001-05 | tmu0459 |
| Winter, james | 11/19/2002 | 258.0 | 0001-14 | njw3248 |

CERTIFICATION

We have reviewed and comprehend our state association's principles governing proper weight management. We certify that the skin-fold/hydrostatic weighing, body density, % body fat, and minimum wrestling weight are calculated in accordance with the enclosed instructions. We certify that the athlete will achieve any weight loss at a rate not to exceed 1.5% of original hydrated body weight per week.

Signatures Required

Athletic Trainer: _____ Head Wrestling Coach: _____

*FIG. 2G*

NWCA Wrestling Weight Certification
2002-03 Initial Assessment to Determine Minimum Wrestling Weight Name of Student-Athlete (first, initial, last): John | J | Smith  Click to add Female wrestler.

School Name: NWCA Test High School, PA

Grade: 11  Gender: Male

CALCULATION OF MINIMUM WRESTLING WEIGHT

STEP 1. ALPHA BODY WEIGHT (BW)

Alpha Date: November 10, 2002

Urine Specific Gravity: Pass

Alpha Body Weight (BW) (Recorded to tenth of a pound, no rounding.)

$BW = 200.0$

Step 2. BODY DENSITY (BD) Calculate body density by SKIN-FOLD, HYDROSTATIC, BOD-POD or BIO-IMPEDENCE WEIGHING technique

SKIN-FOLD MEASUREMENTS (To the nearest half of a millimeter)

| | Test 1 | Test 2 | Test 3 | Median Value |
|---|---|---|---|---|
| Triceps (T) | 15 | 17 | 15 | 15 |
| Subscapular (S) | 13 | 14 | 12 | 13 |
| Abdominal (A) | 24 | 22 | 19 | 22 |

Median(T) + Median(S) + Median(A) = Sum Skin-Folds (SUM SF) = 50

OR

HYDROSTATIC, BOD-POD OR BIO-IMPEDENCE WEIGHING (Direct measure of residual volume (RV) required.)

Provide as an attachment to this form.
- RV measurement technique
- RV raw data & calculations

Begin data entry with Step 3!

$BD = [1.0973 - ((SUM\ SF) * .000815)] + [(SUM\ SF)^2 * (.00000084)]$ $BD = 1.0586499999999$

Step 3. *Percentage of Body Fat (%BF)* $= [(4.57/BD) - 4.142] * 100$ $\%BF = 17.481858971331$

Step 4. *Fat Weight (FW)* $=$ Body Weight(BW)*(%BF/100)

$FW = 34.963717942662$

Step 5. *Fat Free Weight (FFW)* $=$ Body Weight(BW)-Fat Weight(FW)

$FFW = 165.03628205733$

Step 6. *Minimum Wrestling Weight (MWW)* $=$ Fat Free Weight(FFW)/0.93

$MWW = 177.45836780358$

THERE IS NO EVIDENCE, SCIENTIFIC OR OTHERWISE, THAT THE MINIMAL WRESTLING WEIGHT IS THE OPTIMAL WEIGHT FOR WRESTLING PERFORMANCE.

CERTIFICATION

We have reviewed and comprehend our state association's principles governing proper weight management. We certify that the skin-fold/hydrostatic weighing, body density, % body fat, and minimum wrestling weight are calculated in accordance with the enclosed instructions. We certify that the athlete will achieve any weight loss at a rate not to exceed 1.5% of original hydrated body weight per week.

Signatures Required

Student Athlete: _____ Athletic Administrator: _____

☐ STUDENT-ATHLETE: I verify that the coach and/or athletics trainer has reviewed the NCAA weight management rules handout and rules video information during the pre-season meeting.

Athletic Trainer: _____ Head Wrestling Coach: _____

Person performing above tests if not athletic trainer: _____ Title: _____

This form must be completed no later than the first official practice. Please send this form, the accompanying Weight Loss Plan and the Alpha Master form to the appropriate state association office, after making file copies for the appropriate individuals at your institution, no later than the first official practice. No faxes will be accepted.

NWCA Wrestling Weight Certification
Alpha Master Report
Date: 12/18/2002

Coaches: Supply a copy of this report to each opponent coach or the tournament manager when more than four teams are involved on a date of competition. Retain a master copy in your files and include a copy with both your individual and team entry blank.

School: NWCA Test High School
PO Box 54
Manhiem, PA 17545

Wrestling coaches must have this form available before each contest, or provide a copy to each opponent coach.

| WRESTLER NAME | Alpha Date | Alpha Weight | Alpha % Body Fat | Min WR Weight | Min Wgt Class | 1st Date at Min Class |
|---|---|---|---|---|---|---|
| Bowyer, Jeff | 11/14/2002 | 170.0 | 18.00 | 149.89 | 152 | 1/9/2003 |
| Brown, John | 11/11/2002 | 140.0 | 12.26 | 132.09 | 135 | 12/2/2002 |
| crosby, sam | 12/3/2002 | 170.0 | 18.00 | 149.89 | 152 | 1/28/2003 |
| hoffman, mark | 11/14/2002 | 170.0 | 15.00 | 155.38 | 160 | 12/12/2002 |
| Hossler, Phil | 12/25/2002 | 210.0 | 15.00 | 191.94 | 215 | 12/25/2002 |
| Johns, Ed | 11/26/2002 | 160.4 | 12.00 | 151.78 | 152 | 12/24/2002 |
| Johns, Tommy | 11/27/2002 | 175.6 | 15.30 | 159.93 | 160 | 1/8/2003 |
| Johns, Tommy | 11/27/2002 | 175.6 | 15.30 | 159.93 | 160 | 1/8/2003 |
| moyer, dave | 11/14/2002 | 170.0 | 15.00 | 155.38 | 160 | 12/12/2002 |
| Moyer, Dave | 11/16/2002 | 190.0 | 17.48 | 168.59 | 171 | 1/4/2003 |
| moyer, mike | 11/1/2002 | 200.0 | 16.59 | 179.38 | 189 | 11/29/2002 |
| Munger, Richard | 12/9/2002 | 160.0 | 16.59 | 143.51 | 145 | 1/27/2003 |
| Smith, John | 11/10/2002 | 200.0 | 17.48 | 177.46 | 189 | 12/8/2002 |
| Timko, Steve | 12/10/2002 | 190.0 | 18.00 | 167.53 | 171 | 1/28/2003 |

CERTIFICATION

We have reviewed and comprehend our state association's principles governing proper weight management. We certify that the skin-fold/hydrostatic weighing, body density, % body fat, and minimum wrestling weight are calculated in accordance with the enclosed instructions. We certify that the athlete will achieve any weight loss at a rate not to exceed 1.5% of original hydrated body weight per week.

Signatures Required

Athletic Trainer: _____    Head Wrestling Coach: _____

NWCA Wrestling Weight Certification
WEIGHT LOSS PLAN

This form is to be used to project permissible weight loss and the first date for the student-athlete to compete at the minimum wrestling weight class. There is no evidence, scientific or otherwise, that the minimal wrestling weight is the optimal weight for wrestling performance.

Wrestler - School: John Smith - NWCA Test High School

Alpha Body Weight (initial assessment): BW = __200.0__   Maximum Weight loss per week (.015 x BW) = __3__

| DATE | | PROJECTED | ACTUAL |
|---|---|---|---|
| 11/10/2002 | Initial Assessment | | |
| 11/17/2002 | Week 1 [BW-(Max. Weight Loss*1)] | 197.00 | |
| 11/24/2002 | Week 2 [BW-(Max. Weight Loss*2)] | 194.00 | |
| 12/1/2002 | Week 3 [BW-(Max. Weight Loss*3)] | 191.00 | |
| 12/8/2002 | Week 4 [BW-(Max. Weight Loss*4)] | 188.00 | |
| 12/15/2002 | Week 5 [BW-(Max. Weight Loss*5)] | 185.00 | |
| 12/22/2002 | Week 6 [BW-(Max. Weight Loss*6)] | 182.00 | |
| 12/29/2002 | Week 7 [BW-(Max. Weight Loss*7)] | 179.00 | |
| 1/5/2003 | Week 8 [BW-(Max. Weight Loss*8)] | 177.46 | |
| 1/12/2003 | Week 9 [BW-(Max. Weight Loss*9)] | 177.46 | |
| 1/19/2003 | Week 10 [BW-(Max. Weight Loss*10)] | 177.46 | |
| 1/26/2003 | Week 11 [BW-(Max. Weight Loss*11)] | 177.46 | |
| 2/2/2003 | Week 12 [BW-(Max. Weight Loss*12)] | 177.46 | |
| 2/9/2003 | Week 13 [BW-(Max. Weight Loss*13)] | 177.46 | |
| 2/16/2003 | Week 14 [BW-(Max. Weight Loss*14)] | 177.46 | |

CERTIFICATION

We have reviewed and comprehend our state association's principles governing proper weight management. We certify that the skin-fold/hydrostatic weighing, body density, % body fat, and minimum wrestling weight are calculated in accordance with the enclosed instructions. We certify that the athlete will achieve any weight loss at a rate not to exceed 1.5% of original hydrated body weight per week.

Signatures Required
Student Athlete:_____ Athletic Administrator:_____
Athletic Trainer:_____ Head Wrestling Coach:_____

This form must be returned to the appropriate state association office along with the Initial Assessment Form. This form is to be used by Institutional sports medicine staff and the student-athlete each week to ensure compliance with NWCA weight management guidelines. Each institution should also keep a copy of this form on file.

FIG. 2J

NWCA Wrestler Nutrition Plan

*Wrestler Name:* John Smith

*School:* NWCA Test High School

*Alpha Weight:* 90.7194 kg (200.0 lbs)

Step 1: Enter your age: [ 17 ]

Step 2: Enter your height: [ 6 ] ft [ 2 ] in

Step 3: Select your physical activity level:

[ Very Active ▼ ]

Note: Very Active activity level is equivalent to 10-30 miles of walking per day. If you are currently a member of a sport team (wreslting, football, cross-country, etc.) and are in-season, choose this category.

Moderately Active is equivalent to 3-10 miles of walking per day. If you are currently a member of a sport team (wreslting, football, cross-country, etc) and are out of season, chooes this category.

Low Physical Activity is equivalent to 1.5-3 miles of walking per day. If you are not a member of a sport team (wreslting, football, cross-country, etc) and engage in very little leisure time physical activity, choose this category.

[ Continue ]     [ Cancel ]

*FIG. 3B*

NWCA Wrestler Nutrition Plan

*Wrestler Name:* John Smith

*Age:* 17

*Gender:* Male

*Alpha Weight:* 90.7194 kg

*Height:* 1.8796 meters

*Daily Activity:* Very Active

*Max Weight Loss:* 3.00 lbs/week   (1500 kcal/day)

Step 4: Your calculated Total Energy Expenditure per day is:   5487.60 kcal/day

Step 5: Your recommended dietary plan:   3500 Calorie Diet Plan

NWCA Wrestler Nutrition Plan

*Wrestler Name:* John Smith

*Diet Plan:* 3500 Calorie

Step 6: Your calculated Food Exchange Options for 3500 kcal/day are:

*3 Nonfat Dairy    7 Fruit*
    *8 Lean Protein   18 Starch*
    *8 Vegetables    600 Extra Calories*

[ Continue ]    [ Cancel ]

*FIG. 3D*

NWCA Wrestler Nutrition Plan

*Wrestler Name:* John Smith

Step 7: Select 3 Nonfat Dairy Exchanges from the table below:  (clear selections)

*Items selected:*
1. Fat-free milk (1 cup)
2. Evaporated fat-free milk (1/2 cup)
3. Nonfat or low-fat fruit-flavored yogurt sweetened (1 cup)

One milk selection equals: 12 grams carbohydrates and 8 grams protein.

| Fat-Free and Low-Fat Milk (0–3 g Fat per Serving) | |
|---|---|
| Fat-free milk | 1 cup |
| 1/2% milk | 1 cup |
| 1% milk | 1 cup |
| Fat-free or low-fat buttermilk | 1 cup |
| Evaporated fat-free milk | 1/2 cup |
| Fat-free dry milk | 1/3 cup dry |
| Plain nonfat yogurt | 3/4 cup |
| Nonfat or low-fat fruit-flavored yogurt sweetened | 1 cup |

Continue    Cancel

*FIG. 3E*

NWCA Wrestler Nutrition Plan

*Wrestler Name:* John Smith

Step 8: Select 8 Lean Protein Exchanges from the table below: (clear selections)

*Items selected:*
1. Chicken (white meat, no skin) (1 oz)
2. Flounder (1 oz)
3. Ostrich (1 oz)
4. Sausage with 1 g or less fat per ounce (1 oz)
5. Shrimp (1 oz)
6. Grated parmesan (2 Tbsp.)
7. Duck or pheasant (no skin) (1 oz)
8. Chicken (white meat, no skin) (1 oz)

One very lean meat selection equals: 0 grams carbohydrates, 7 grams protein, 0-1 grams fat, and 35 calories. One lean meat selection equals: 0 grams carbohydrates, 7 grams protein, 3 grams fat, and 55 calories.

| Very Lean Meat and Substitutes | |
|---|---|
| Poultry | |
| Chicken (white meat, no skin) | 1 oz |
| Turkey (white meat, no skin) | 1 oz |
| Cornish hen (no skin) | 1 oz |
| Fish | |
| Fresh or frozen cod | 1 oz |
| Flounder | 1 oz |
| Halibut | 1 oz |
| Trout | 1 oz |
| Tuna (fresh or canned in water) | 1 oz |
| Shellfish | |
| Clams | 1 oz |
| Crab | 1 oz |
| Lobster | 1 oz |
| Scallops | 1 oz |
| Shrimp | 1 oz |
| Imitation shellfish | 1 oz |
| Game | |
| Duck or pheasant (no skin) | 1 oz |
| Venison | 1 oz |
| Buffalo | 1 oz |
| Ostrich | 1 oz |
| Cheese | |
| Nonfat or low-fat cottage cheese | 1/4 cup |

*FIG. 3F*

| | |
|---|---|
| Other | |
| Processed sandwich meats with 1 g or less fat per ounce | 1 oz |
| Egg whites | 2 |
| Egg substitutes, plain | 1/4 cup |
| Hot dogs with 1 g or less fat per ounce | 1 oz |
| Kidney (high in cholesterol) | 1 oz |
| Sausage with 1 g or less fat per ounce | 1 oz |
| Dried beans, peas, lentils (cooked) - Count as one very lean meat and one starch exchange | 1/2 cup |
| Lean Meat and Substitutes | |
| Beef | |
| USDA Select or Choice grades of lean beef trimmed | 1 oz |
| Pork | |
| Lean pork, such as fresh ham; canned, cured, or boiled ham; Canadian bacon,* tenderloin, center loin chop | 1 oz |
| Veal | |
| Lean chop, roast | 1 oz |
| Poultry | |
| Chicken or turkey (dark meat, no skin) | 1 oz |
| Chicken white meat (with skin) | 1 oz |
| Domestic duck or goose (well-drained of fat, no skin) | 1 oz |
| Fish | |
| Herring (uncreamed or smoked) | 1 oz |
| Oysters | 6 medium |
| Salmon (fresh or canned), catfish | 1 oz |
| Tuna (canned in oil, drained) | 1 oz |
| Cheese | |
| 4.5%-fat cottage cheese | 1/4 cup |
| Grated parmesan | 2 Tbsp. |
| Cheeses with 3 g or less fat per ounce | 1 oz |
| Other | |
| Hot dogs with 3 g or less fat per ounce* | 1 1/2 oz |
| Processed sandwich meats | 1 oz |
| Liver, heart (high in cholesterol) | 1 oz |

*FIG. 3F (cont.)*

Continue    Cancel

NWCA Wrestler Nutrition Plan

Wrestler Name: *John Smith*

Step 9: Select 8 Vegetable Exchanges from the table below: (clear selections)

*Items selected:*
1. Broccoli (1/2 cup cooked, 1 cup raw)
2. Broccoli 1/2 cup cooked, 1 cup raw)
3. Carrots (1/2 cup cooked, 1 cup raw)
4. Cauliflower (1/2 cup cooked, 1 cup raw)
5. Tomatoes, canned (1/2 cup cooked, 1 cup raw)
6. Tomato sauce* (1/2 cup cooked, 1 cup raw)
7. Turnips (1/2 cup cooked, 1 cup raw)
8. Tomatoes, canned (1/2 cup cooked, 1 cup raw)

One vegetable selection equals: 5 grams carbohydrates, 2 grams protein, 0 grams fat, and 25 calories.

| Vegetables | |
|---|---|
| Artichoke | 1/2 cup cooked, 1 cup raw |
| Artichoke hearts | 1/2 cup cooked, 1 cup raw |
| Asparagus | 1/2 cup cooked, 1 cup raw |
| Beans (green, wax, Italian) | 1/2 cup cooked, 1 cup raw |
| Bean sprouts | 1/2 cup cooked, 1 cup raw |
| Beets | 1/2 cup cooked, 1 cup raw |
| Broccoli | 1/2 cup cooked, 1 cup raw |
| Brussels sprouts | 1/2 cup cooked, 1 cup raw |
| Cabbag | 1/2 cup cooked, 1 cup raw |
| Carrots | 1/2 cup cooked, 1 cup raw |
| Cauliflower | 1/2 cup cooked, 1 cup raw |
| Celery | 1/2 cup cooked, 1 cup raw |
| Cucumber | 1/2 cup cooked, 1 cup |

*FIG. 3G*

| | raw |
|---|---|
| Eggplant | 1/2 cup cooked, 1 cup raw |
| Green onions or scallions | 1/2 cup cooked, 1 cup raw |
| Greens (collard, kale, mustard, turnip) | 1/2 cup cooked, 1 cup raw |
| Kohlrabi | 1/2 cup cooked, 1 cup raw |
| Leeks | 1/2 cup cooked, 1 cup raw |
| Mixed vegetables (without corn, peas, or pasta) | 1/2 cup cooked, 1 cup raw |
| Mushrooms | 1/2 cup cooked, 1 cup raw |
| Okra | 1/2 cup cooked, 1 cup raw |
| Onions | 1/2 cup cooked, 1 cup raw |
| Pea pods | 1/2 cup cooked, 1 cup raw |
| Peppers (all varieties) | 1/2 cup cooked, 1 cup raw |
| Salad greens (endive, escarole, lettuce, romaine, spinach) | 1/2 cup cooked, 1 cup raw |
| Spinach | 1/2 cup cooked, 1 cup raw |
| Summer squash | 1/2 cup cooked, 1 cup raw |
| Tomato | 1/2 cup cooked, 1 cup raw |
| Tomatoes, canned | 1/2 cup cooked, 1 cup raw |
| Tomato sauce* | 1/2 cup cooked, 1 cup raw |
| Tomato/vegetable juice* | 1/2 cup cooked, 1 cup raw |
| Turnips | 1/2 cup cooked, 1 cup raw |
| Water chestnuts | 1/2 cup cooked, 1 cup raw |
| Zucchini | 1/2 cup cooked, 1 cup raw |

*FIG. 3G (cont.)*

Continue    Cancel

NWCA Wrestler Nutrition Plan

Wrestler Name: John Smith

Step 10: Select 7 Fruit Exchanges from the table below: (clear selections)

Items selected: 
1. Apricots, fresh (4 whole (5 1/2 oz))
2. Cantaloupe, small (1/3 melon (11 oz) or 1 cup cubes)
3. Apple, unpeeled, small (1 (4 oz))
4. Apple, unpeeled, small (1 (4 oz))
5. Banana, small (1 (4 oz))
6. Blueberries (3/4 cup)
7. Apple juice/cider (1/2 cup)

| Fruit | |
|---|---|
| Apple, unpeeled, small | 1 (4 oz) |
| Applesauce, unsweetened | 1/2 cup |
| Apples, dried | 4 rings |
| Apricots, fresh | 4 whole (5 1/2 oz) |
| Apricots, dried | 8 halves |
| Apricots, canned | 1/2 cup |
| Banana, small | 1 (4 oz) |
| Blackberries | 3/4 cup |
| Blueberries | 3/4 cup |
| Cantaloupe, small | 1/3 melon (11 oz) or 1 cup cubes |
| Cherries, sweet, fresh | 12 (3 oz) |
| Cherries, sweet, canned | 1/2 cup |
| Dates | 3 |
| Figs, fresh | 1 1/2 large or 2 medium (3 1/2 oz) |
| Figs, dried | 1 1/2 |
| Fruit cocktail | 1/2 cup |
| Grapefruit, large | 1/2 (11 oz) |
| Grapefruit sections, canned | 3/4 cup |
| Grapes, small | 17 (3 oz) |
| Honeydew melon | 1 slice (10 oz) or 1 cup cubes |

One fruit selection equals: 15 grams carbohydrates, and 60 calories.

*FIG. 3H*

| | |
|---|---|
| Kiwi | 1 (3 1/2 oz) |
| Mandarin oranges, canned | 3/4 cup |
| Mango, small | 1/2 fruit (5 1/2 oz) or 1/2 cup |
| Nectarine, small | 1 (5 oz) |
| Orange, small | 1 (6 1/2 oz) |
| Papaya | 1/2 fruit (8 oz) or 1 cup cubes |
| Peach, medium, fresh | 1 (6 oz) |
| Peaches, canned | 1/2 cup |
| Pear, large, fresh | 1/2 (4 oz) |
| Pears, canned | 1/2 cup |
| Pineapple, fresh | 3/4 cup |
| Pineapple, canned | 1/2 cup |
| Plums, small | 2 (5 oz) |
| Plums, canned | 1/2 cup |
| Prunes, dried | 3 |
| Raisins | 2 Tbsp. |
| Raspberries | 1 cup |
| Strawberries | 1 1/4 cup whole berries |
| Tangerines, small | 2 (8 oz) |
| Watermelon | 1 slice (13 1/2 oz) or 1 1/4 cup cubes |
| Fruit Juice | |
| Apple juice/cider | 1/2 cup |
| Cranberry juice cocktail | 1/3 cup |
| Cranberry juice cocktail, reduced-calorie | 1 cup |
| Fruit juice blends, 100% juice | 1/3 cup |
| Grape juice | 1/3 cup |
| Grapefruit juice | 1/2 cup |
| Orange juice | 1/2 cup |
| Pineapple juice | 1/2 cup |
| Prune juice | 1/3 cup |

*FIG. 3H (cont.)*

NWCA Wrestler Nutrition Plan

*Wrestler Name:* John Smith

Step 11: Select 18 Starch Exchanges from the table below: (clear selections)

*Items selected:*
1. Bagel (1/2 (1 oz))
2. English muffin (1/2)
3. Bread sticks, crisp, 4 in. long 3 1/2 in. (2 (2/3 oz))
4. Baked beans (1/3 cup)
5. Matzoh (3/4 oz)
6. French-fried potatoes (16–25 (3 oz))
7. Taco shell, 6 in. across (2)
8. Sandwich crackers, cheese or peanut butter filling (3)
9. Bagel (1/2 (1 oz))
10. Bread, reduced-calorie (2 slices (1 1/2 oz))
11. Lentils (1/2 cup)
12. Waffle, 4 1/2 in. square (1)
13. Waffle, 4 1/2 in. square (1)
14. Taco shell, 6 in. across (2)
15. Stuffing, bread (prepared) (1/3 cup)
16. Sandwich crackers, cheese or peanut butter filling (3)
17. Pancake, 4 in. across (2)
18. Corn bread, 2 in. cube (1 (2 oz))

One starch selection equals: 15 grams carbohydrates, 3 grams protein, 0-1 grams fat, and 80 calories.

| Bread | |
|---|---|
| Bagel | 1/2 (1 oz) |
| Bread, reduced-calorie | 2 slices (1 1/2 oz) |
| Bread, white, whole-wheat, pumpernickel, rye | 1 slice (1 oz) |
| Bread sticks, crisp, 4 in. long 3 1/2 in. | 2 (2/3 oz) |
| English muffin | 1/2 |
| Hot dog or hamburger bun | 1/2 (1 oz) |
| Pita, 6 in. across | 1/2 |
| Roll, plain, small | 1 (1 oz) |
| Raisin bread, unfrosted | 1 slice (1 oz) |
| Tortilla, corn, 6 in. across | 1 |
| Waffle, 4 1/2 in. square, reduced-fat | 1 |

*FIG. 31*

| Cereals and Grains | |
|---|---|
| Bran cereals | 1/2 cup |
| Bulgur | 1/2 cup |
| Cereals | 1/2 cup |
| Cereals, unsweetened, ready-to-eat | 3/4 cup |
| Cornmeal (dry) | 3 Tbsp. |
| Flour (dry) | 3 Tbsp. |
| Granola, low-fat | 1/4 cup |
| Grape-Nuts | 1/4 cup |
| Grits | 1/2 cup |
| Millet | 1/4 cup |
| Muesli | 1/4 cup |
| Oats | 1/2 cup |
| Pasta | 1/2 cup |
| Rice, white or brown | 1/3 cup |
| Shredded Wheat | 1/2 cup |
| Wheat germ | 3 Tbsp. |

| Starchy Vegetables | |
|---|---|
| Baked beans | 1/3 cup |
| Corn | 1/2 cup |
| Corn on cob, medium | 1 (5 oz) |
| Mixed vegetables with corn, peas, or pasta | 1 cup |
| Peas, green | 1/2 cup |
| Plantain | 1/2 cup |
| Potato, baked or boiled | 1 small (3 oz) |
| Potato, mashed | 1/2 cup |
| Squash, winter (acorn, butternut, pumpkin) | 1 cup |
| Yam, sweet potato, plain | 1/2 cup |

| Crackers and Snacks | |
|---|---|
| Animal crackers | 8 |
| Graham crackers, 2 1/2 in. square | 3 |
| Matzoh | 3/4 oz |
| Oyster crackers | 24 |
| Popcorn (popped, no fat added or low-fat microwave) | 3 cups |
| Pretzels | 3/4 oz |
| Rice cakes, 4 in. across | 2 |
| Saltine-type crackers | 6 |
| Snack chips, fat-free (tortilla, potato) | 15-20 (3/4 oz) |

*FIG. 31 (cont.)*

| Dried Beans, Peas, Lentils (Count as 1 Starch Exchange plus 1 Very Lean Meat Exchange) | |
|---|---|
| Beans and peas (garbanzo, pinto, kidney, white, split, black-eyed) | 1/2 cup |
| Lima beans | 2/3 cup |
| Lentils | 1/2 cup |
| Miso* | 3 Tbsp. |
| Starchy Foods Prepared with Fat (Count as 1 Starch Exchange, plus 1 Fat Exchange) | |
| Biscuit, 21/2 in. across | 1 |
| Corn bread, 2 in. cube | 1 (2 oz) |
| Crackers, round butter type | 6 |
| Croutons | 1 cup |
| French-fried potatoes | 16–25 (3 oz) |
| Granola | 1/4 cup |
| Muffin, small | 1 (11/2 oz) |
| Pancake, 4 in. across | 2 |
| Popcorn, microwave | 3 cups |
| Sandwich crackers, cheese or peanut butter filling | 3 |
| Stuffing, bread (prepared) | 1/3 cup |
| Taco shell, 6 in. across | 2 |
| Waffle, 41/2 in. square | 1 |
| Whole-wheat crackers, fat added | 4–6 (1 oz) |

Continue    Cancel

*FIG. 31 (cont.)*

NWCA Wrestler Nutrition Plan

Wrestler Name: John Smith

Step 12: Select 600 Extra Calories from any category:  (clear selections)

Calories remaining: 600

Selection Categories:

- Nonfat Dairy    0 selected.
- Lean Proteins    0 selected.
- Vegetables    0 selected.
- Fruits    0 selected.
- Starches    0 selected.

[ Generate Diet Report ]    [ Cancel ]

*FIG. 3J*

NWCA Wrestler Meal Plan

Meal Plan for: John Smith  
School: NWCA Test High School  
Alpha Weight: 90.7194 kg (200.0 lbs)

Date: 1/8/2003

Max Weight Loss/Week: 3.00 lbs

Total Energy Expenditure: 5487.60 kg

Recommended Diet Plan: 3500 Calories/Day

FOOD EXCHANGE SELECTIONS

Nonfat Dairy: — Serving Size
1. Fat-free milk — 1 cup
2. Evaporated fat-free milk — 1/2 cup
3. Nonfat or low-fat fruit-flavored yogurt sweetened — 1 cup

Lean Protein: — Serving Size
1. Chicken (white meat, no skin) — 1 oz
2. Flounder — 1 oz
3. Ostrich — 1 oz
4. Sausage with 1 g or less fat per ounce — 1 oz
5. Shrimp — 1 oz
6. Grated parmesan — 2 Tbsp.
7. Duck or pheasant (no skin) — 1 oz
8. Chicken (white meat, no skin) — 1 oz

Vegetables: — Serving Size
1. Broccoli — 1/2 cup cooked, 1 cup raw
2. Broccoli — 1/2 cup cooked, 1 cup raw
3. Carrots — 1/2 cup cooked, 1 cup raw
4. Cauliflower — 1/2 cup cooked, 1 cup raw
5. Tomatoes, canned — 1/2 cup cooked, 1 cup raw
6. Tomato sauce* — 1/2 cup cooked, 1 cup raw
7. Turnips — 1/2 cup cooked, 1 cup raw
8. Tomatoes, canned — 1/2 cup cooked, 1 cup raw

Fruits: — Serving Size
1. Apricots, fresh — 4 whole (5 1/2 oz)
2. Cantaloupe, small — 1/3 melon (11 oz) or 1 cup cubes
3. Apple, unpeeled, small — 1 (4 oz)
4. Apple, unpeeled, small — 1 (4 oz)
5. Banana, small — 1 (4 oz)
6. Blueberries — 3/4 cup
7. Apple juice/cider — 1/2 cup

Starches: — Serving Size
1. Bagel — 1/2 (1 oz)
2. English muffin — 1/2
3. Bread sticks, crisp, 4 in. long 3 1/2 in. — 2 (2/3 oz)
4. Baked beans — 1/3 cup
5. Matzoh — 3/4 oz
6. French-fried potatoes — 16–25 (3 oz)

*FIG. 3K*

| | |
|---|---|
| 7. Taco shell, 6 in. across | 2 |
| 8. Sandwich crackers, cheese or peanut butter filling | 3 |
| 9. Bagel | 1/2 (1 oz) |
| 10. Bread, reduced-calorie | 2 slices (1 1/2 oz) |
| 11. Lentils | 1/2 cup |
| 12. Waffle, 4 1/2 in. square | 1 |
| 13. Waffle, 4 1/2 in. square | 1 |
| 14. Taco shell, 6 in. across | 2 |
| 15. Stuffing, bread (prepared) | 1/3 cup |
| 16. Sandwich crackers, cheese or peanut butter filling | 3 |
| 17. Pancake, 4 in. across | 2 |

Extra Calories:     Serving Size

| | |
|---|---|
| 1. Cornish hen (no skin) | 1 oz |
| 2. Brussels sprouts | 1/2 cup cooked, 1 cup raw |
| 3. Pita, 6 in. across | 1/2 |
| 4. Bran cereals | 1/2 cup |
| 5. Bran cereals | 1/2 cup |
| 6. Bran cereals | 1/2 cup |
| 7. Bran cereals | 1/2 cup |
| 8. Bran cereals | 1/2 cup |
| 9. Tuna (fresh or canned in water) | 1 oz |
| 10. Carrots | 1/2 cup cooked, 1 cup raw |

(View Sample Menu Plans)     (Return to NWCA Main Menu)

*FIG. 3K (cont.)*

SYSTEM AND METHOD FOR MONITORING WEIGHT AND NUTRITION

PRIOR APPLICATION

This application claims priority to U.S. provisional application Ser. No. 60/391,587, filed Jun. 27, 2002, the entire contents of which are hereby incorporated by reference.

BACKGROUND

1. Technical Field

The present invention relates generally to products and methods useful for monitoring body weight and nutrition, and more particularly to methods and products that can be used over the Internet or through software to calculate and monitor body weight and nutrition, especially for those in sports programs that weight monitoring, such as wrestling.

2. Related Art

Athletes, especially wrestlers, may lose weight very rapidly to gain a competitive advantage. Athletes often use rapid weight reduction methods in order to qualify for a certain weight classification. For some wrestlers, in particular, weight loss is excessive and often accomplished by methods that lead to loss of lean body mass and total body water. There is evidence that this excessive and rapid weight loss is unhealthy, especially for high school wrestlers who have not yet completed their growth and development. Negative health consequences include growth retardation, decreased academic and cognitive performance, and altered endocrine or hormonal function. Cycling of body weight may also decrease strength, power and endurance, diminishing a wrestler's likelihood of success. Three tragic deaths in late 1997 prompted the National Collegiate Athletic Association (NCAA) to make a Wrestling Weight Certification Program (WWCP) mandatory to foster a safe competitive environment.

U.S. Pat. Nos. 5,937,387 to Summerell et al., 5,954,640 to Szabo and 6,368,272, to Porumbescu describe various nutritional methods and algorithms. Summerell's system can be accessed through either an Internet or intranet format, or implemented in a stand-alone mode or a workstation or a PC. However, none of these methods provides a product or method that is easily employed by a user to determine how much weight a particular individual can be expected to lose or maintain without adverse affect to their body, and to build a nutrition plan.

U.S. Pat. No. 5,839,901 to Karkanen discloses an integrated weight loss control method. Karkanen fails to disclose, however, monitoring a subject's weight to determine a maximum allowable weight loss over successive time periods, and building a nutrition plan to conform to the allowable weight loss values.

U.S. Pat. No. 4,951,197 to Mellinger discloses a weight loss management system. Mellinger fails to disclose, however, monitoring a subject's weight to determine a maximum allowable weight loss over successive time periods and building a nutrition plan to conform to the allowable weight loss values.

SUMMARY OF THE INVENTION

According to a first embodiment, a method of conducting a weight and nutritional program over a network comprises providing a menu of data entry options, at least one of the data entry options allowing entry of data for an assessment of a subject, generating a weight plan based on the subject assessment data, the weight plan including a plurality of minimum weights for the subject, each of the minimum weights being associated with a time, and generating a nutritional plan based on the subject data entered. Generating the nutrition plan comprises providing a series of food exchange item displays to the user, receiving food exchange item selections from the user, and generating a nutritional plan based on the user's selections.

According to the first embodiment, a subject is informed of minimum weights that he or she can occupy at selected time periods. The method also provides a nutrition plan keyed to help the subject honor the weight plan. The method is particularly useful for wrestlers involved in collegiate or scholastic wrestling programs, where weight loss by wrestlers is governed by governing body regulations.

According to a second embodiment, a method for providing a nutritional plan comprises determining an expected energy expenditure for a subject based at least in part on the subject's predicted activity level, determining a recommended energy intake based on the expected energy expenditure, providing a list of food exchanges for the subject, allowing the subject to select items from the food exchanges, and providing the nutritional plan resulting from the subject's selections.

According to the second embodiment, a subject obtains an accurate assessment of how many calories he or she should intake in order to follow a diet plan. The method is advantageous in that the subject is then provided with the capability to construct a menu that allows the subject to honor the diet plan.

According to a third embodiment, a method for generating a weight plan for a subject, comprises receiving an input of the subject's weight, determining the subject's body fat percentage, calculating a lowest allowable weight-one (allowable weight at a first time period) based at least in part on the subject's body fat percentage, and determining a plurality of minimum weight values based on the lowest allowable weight-one, each weight value being associated with a time.

According to the third embodiment, the subject is provided with a schedule of minimum weights that he or she may occupy at any time.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE FIGURES

FIGS. 2C-2J illustrate various displays for executing the method for providing nutritional and weight information;

FIGS. 3B-3K illustrate various displays for executing the method for generating a nutrition plan;

DETAILED DESCRIPTION

In accordance with the embodiments discussed below, a system and method are disclosed for providing weight and nutrition information. The information can describe, for example, a weight plan for a subject, a subject's compliance status with a weight plan, a nutrition plan for a subject, and other information regarding a subject's weight, health, or nutritional status. The system and method can be used, for example, to determine how much weight a subject can lose while avoiding possible adverse effects on their health. The nutrition plan can be used to ensure that the subject follows the weight plan.

The system and method disclosed in this specification are particularly suitable for young subjects who are still growing and may not fully understand the harm that they may cause by losing or gaining too much weight. According to one embodiment, a user can determine a subject's minimum weight for a series of time periods, and a build a diet plan according to factors such as the user's initial body fat percentage, height, weight, and perhaps also, age. The minimum weight at each time period can be determined according to guidelines published by state and national athletic organizations, such as the National Collegiate Athletic Association (NCAA).

In one embodiment, the weight certification program of the present invention is a web-based application that is used to monitor the weight of certain classes of subjects. For example, collegiate and scholastic (e.g., high school) wrestlers are governed by specific weight guidelines, and the web-based application can be used to monitor their weight and/or nutritional status.

Figure 1:
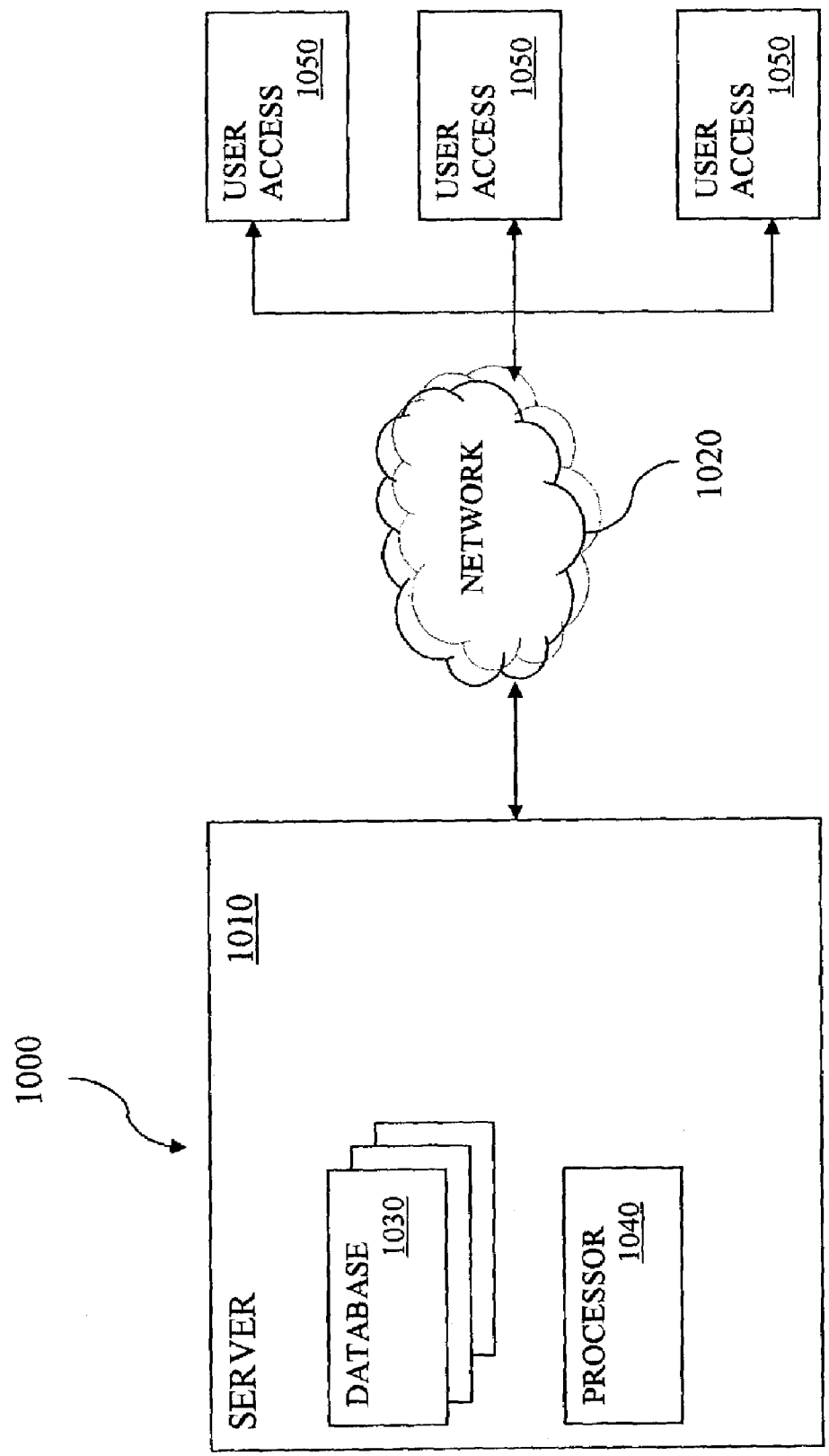
FIG. 1 is a block diagram of an embodiment of a system for providing nutritional and weight information.

FIG. 1 is a block diagram of a web-based application of an embodiment of the present invention. The embodiment is a web-based system 1000 for monitoring weight and for providing nutritional information. The system 1000 can perform functions, such as, for example, building a diet plan for a subject, and providing access to users, who need not necessarily be the subject, to information regarding the subject. The monitoring can be performed, for example, to ensure that the subject complies with state, national, or other governing body guidelines.

The system 1000 comprises a server 1010 connected to a network 1020. The server 1010 comprises one or more databases or objects 1030. The databases 1030 can store information relating to weight and nutritional standards, user interface programs, food exchange data, and programs relating to remote access by users such as web browsers and user interface programs.

The network 1020 connects the system 1000 to a plurality of user access ports 1050.

The user access ports 1050 can be, for example, a remote computer, a laptop, a personal computer, a workstation or any other processing device located at a site controlled by the user. Alternatively or in addition to the previous embodiment, a user access port 1050 can be located at a site controlled by an owner of the system 1000, and can also be owned by the system 1000 owner. Any number of access ports 1050 can be coupled to the server 1010 on dedicated or non-dedicated access lines.

The network 1020 can be, for example, the Internet, or any other network that allows an exchange of information between a user and the server 1010. In one embodiment, the network 1020 is a dedicated dial-up or local area network (LAN) network. The network 1020 may include hardware such as is known in the art, including an information line, and one or more routers. The information line can be, for example, a telephone line or hardware supporting access via a satellite communication apparatus. The router can be, for example, the Internet backbone.

The server 1010 can be programmed to run and/or access one or more programs in accordance with the methods discussed in this specification. In one embodiment, the server 1010 is programmed to execute a method for monitoring a subject's weight. The subject can be the user operating at a user access port 1050, or the subject can be a third party whose weight or other data is entered by the user. For example, the user can be the parent and/or coach of an athlete (subject) participating in organized sports, or a designated assessor. The server 1010 can also be programmed to execute a method for developing a nutritional plan for a subject, as discussed below.

The server 1010 can include a user interface 1060, which may be used to present menus, prompt screens, data displays, and other information to a user at a user access port 1050. The various prompts and screens presented to users by the interface 1060 are discussed in detail below. The user interface 1060 can comprise one or more programs, databases or objects, allowing input by a user and/or transmission of information to the user.

The user access ports 1050 can include any processing devices capable of running a network-interfacing program such as, for example, a web browser. In a preferred embodiment, the user access port 1050 is a personal computer (PC) programmed with software for communicating with the server 1010. The software can include executable instructions for providing data such as, for example, password and login information for access to the server 1010, formatting information for providing data to the server 1010 in the proper format, or instructions for constructing, for example, prepared forms which may be completed at the user access port 1050 and subsequently forwarded to the server 1010. Alternatively, the server 1010 can include a database of forms that may be completed by a user while the user is in communication with the server 1010 (e.g., while the user is on line). In addition, the user access ports 1050 can have one or more peripherals attached thereto.

Figure 2A:
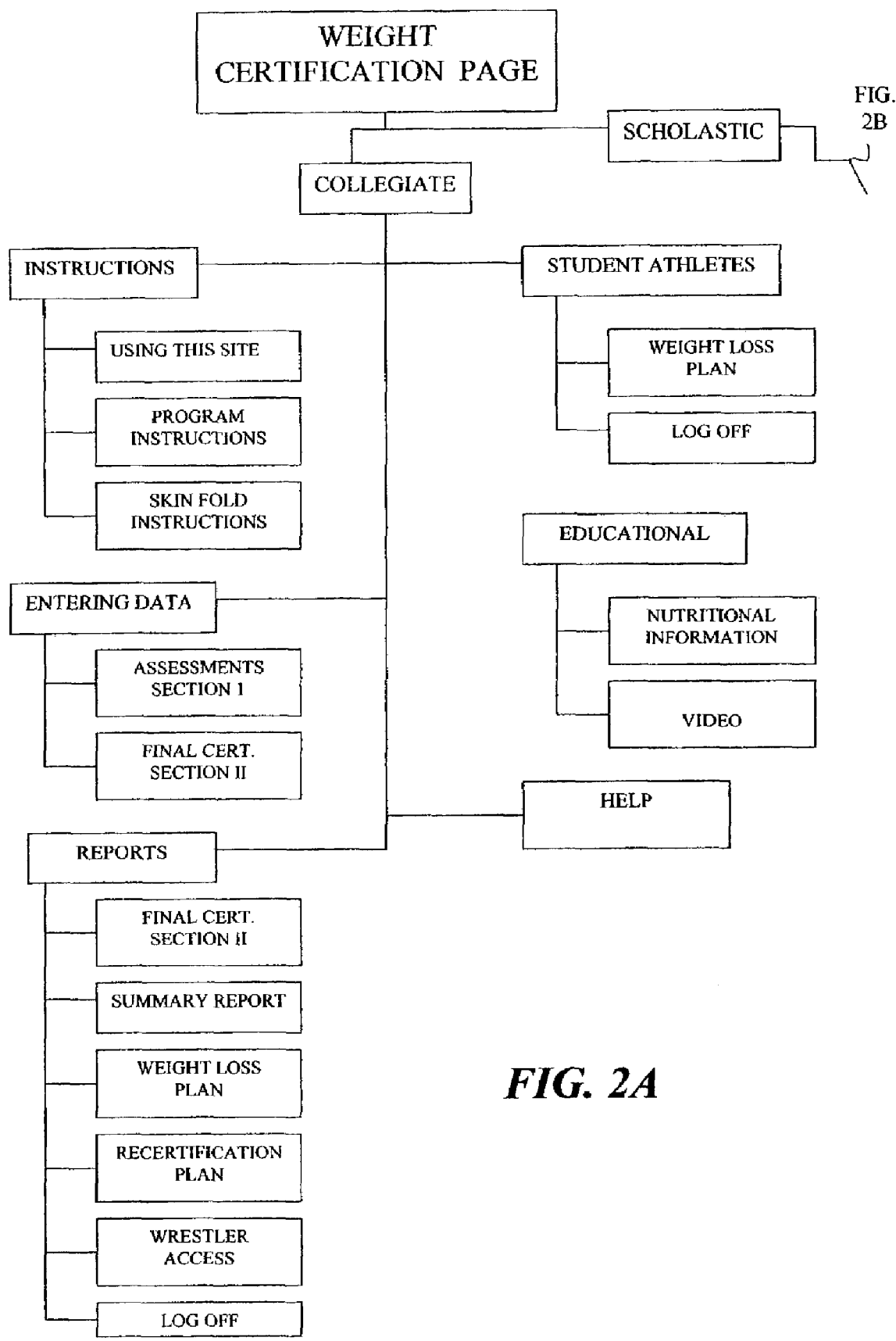
FIGS. 2A and 2B illustrate menu options for executing a method for providing nutritional and weight information.
Figure 2B:
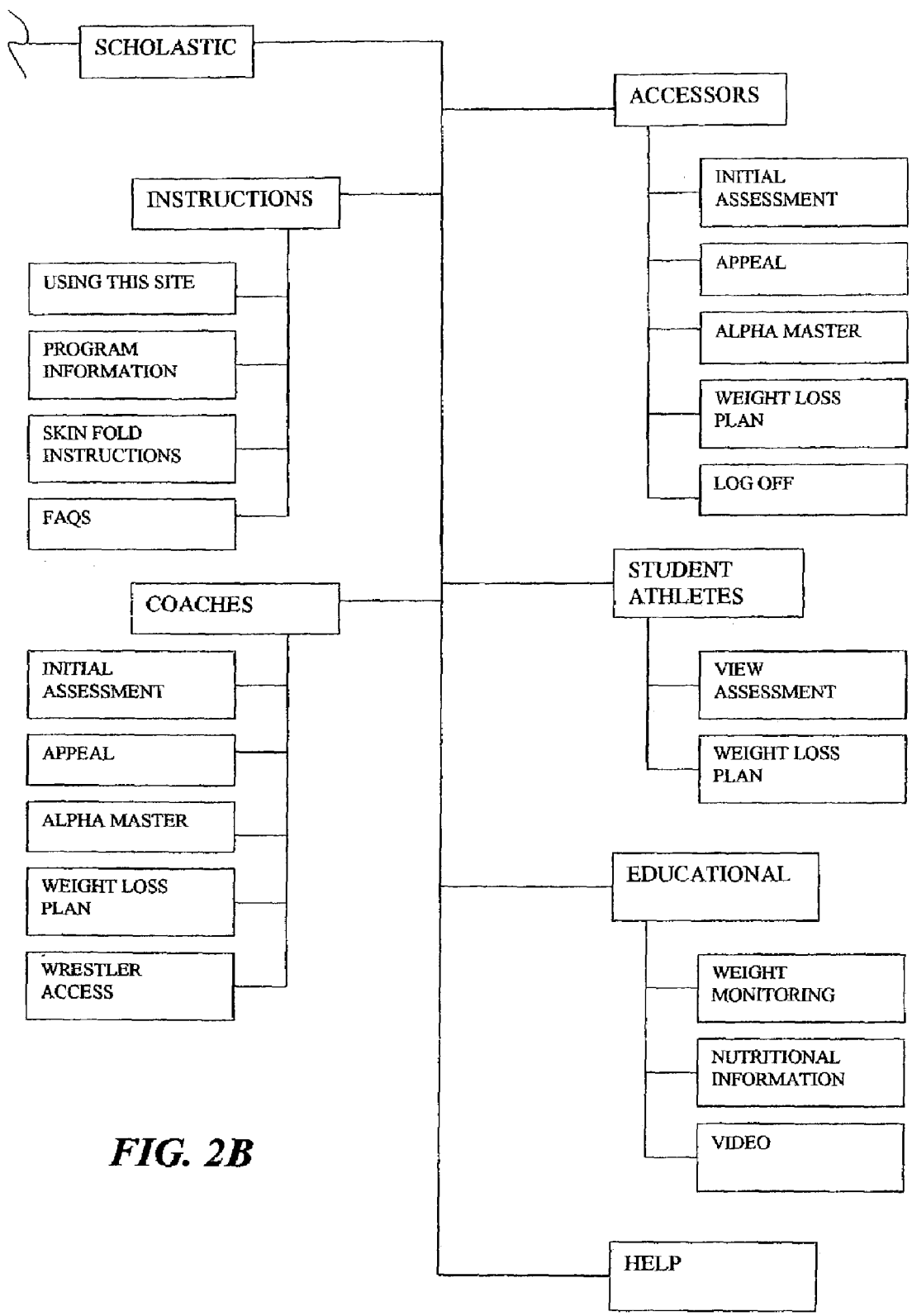

FIGS. 2A and 2B illustrate a website arrangement for providing a weight certification service, weight plans, nutritional information, and diet plans to users. The website arrangement can be used to provide weight certification and compliance information, nutritional plans, and weight loss plans concerning one or more subject. In some cases, a user of the website will be a subject, and in other cases the user will be a third party. For example, as in the case of scholastic wrestlers, the subject wrestler will usually have access only to selected portions of the website (i.e., the subject is a user), and a third party user such as a coach or parent may have access to that subject's data and to other information.

The website discussed below is discussed with reference to a collegiate or scholastic wrestler. However, the general principles discussed below may be applicable to any number of sports, particularly those in which weight and/or nutrition are relevant factors for qualification for the sport. In addition, many aspects of the website can be used by users who are simply interested in obtaining a nutrition and/or weight loss plan, and who may not be interested in participating in a sport. The website arrangement can be programmed on and executed by the server 1010 illustrated in FIG. 1, or by other server arrangements. The website arrangement can also be in the form of an executable program stored on a digital medium readable by, for example, a microcomputer or personal computer.

Referring to FIG. 2A, a WEIGHT CERTIFICATION PAGE provides a menu option for a COLLEGIATE menu and a SCHOLASTIC menu. The COLLEGIATE option may be used to obtain information regarding athletes governed by collegiate sports standards, such as those provided by the NCAA and the NAIA. The SCHOLASTIC menu option can be used to obtain weight information regarding athletes governed by one or more of the various state and local governing bodies. The options provided under the COLLEGIATE menu option can be tailored to conform to the appropriate governing body. At the present time, NCAA weight guidelines are used by collegiate governing bodies. The options provided under the SCHOLASTIC menu option can also be tailored to conform to a particular governing body's requirements. At the present time, NCAA weight requirements are acceptable by most state and local collegiate governing bodies. A subject who is not governed by any particular governing body can select, for example, either the COLLEGIATE or the SCHOLASTIC menu. In general, the weight loss and nutrition guideline information provided under both options is advantageous to users regardless of their participation in sport.

The COLLEGIATE menu is illustrated in FIG. 2A. The SCHOLASTIC menu is illustrated in FIG. 2B. If the user is neither a collegiate nor a scholastic sport participant, the user may elect to simply access, for example, the collegiate mode. In an alternative embodiment, the collegiate/scholastic option may be omitted and access can be provided directly to the menu options disclosed under the COLLEGIATE and SCHOLASTIC menu options, where applicable. Access to the various menus may be provided according to the user's identity. For example, in a state with mandatory weight certification programs, entry of data through menu options may be restricted to persons such as coaches, or assessors designated by the relevant governing body or bodies.

The INSTRUCTIONS menu option can be selected to obtain specific information for using each of the menu options in the website, or for other information relevant to the site. The INSTRUCTIONS menu can include, for example, a description of skin fold measurements.

The ENTERING DATA menu option is provided to allow a user to input data regarding a subject. The subject may, in effect, be the user, who may enter his or her own data. The ASSESSMENTS SECTION I option provides access to an NCAA Wrestling Weight Certification Section I form, which is illustrated as FIG. 2C. The Section I form is used to provide an initial assessment of a wrestler at the date of the initial assessment, or "alpha" date. As shown in FIG. 2C, the ASSESSMENTS SECTION I menu option generates various weight data for the subject wrestler. The weight data generated includes a lowest allowable weight-one (LAW 1), body density (BD), percentage of body fat (% BD), fat weight (FW), free fat weight (FFW), lowest allowable weight-two (LAW 2), and a lowest minimum wrestling weight (MWW). The NCAA provides the Weight Certification Section I form and the calculations used to determine the above data.

After completing the NCAA Wrestling Weight Certification Section I form, the data may be saved, and the form can be printed. The subject wrestler's information is thereby saved in the system.

The ASSESSMENTS SECTION II menu option provides a user access to an NCAA Wrestling Weight Certification Section II form, which is illustrated as FIG. 2D. The form is generally completed before a wrestler's first competition. The Section II form is used to ensure that the subject wrestler conforms to NCAA body fat percentage requirements. The FINAL CERTIFICATION SECTION II option is used to verify wrestler status.

The REPORTS option is used to generate reports for information entered regarding one or more subjects. The SECTION I AND II REPORTS menu options can be used to generate reports for all of the wrestlers on a particular coach's team, and may list all of the Section I and Section II information, respectively. The SUMMARY REPORT menu option allows the user to display and print a summary of different data concerning those subjects for which the user has access to. A Squad List Summary Report is illustrated as FIG. 2E. The WEIGHT LOSS PLAN menu option provides a printout of a weight loss regimen generated by the weight certification website. A sample weight loss plan is illustrated as FIG. 2F. In general, the WEIGHT LOSS PLAN describes a permissible maximum weight loss for the subject. Each date on the form includes a minimum weight that the subject may have at that time. In the form shown in FIG. 2F, the minimum weights are calculated to the NCAA standard of a maximum loss of 1.5% of body weight in any one week period. The RECERTIFICATION FORM menu option is used to generate a form to allow a wrestler to return to a previous weight class. The WRESTLER ACCESS menu option generates a list of wrestlers, their alpha date, alpha weight (i.e., weight at initial assessment), login ID, and login password. A sample wrestler access form is illustrated as FIG. 2G.

The STUDENT ATHLETES menu option is used to generate a weight loss plan for a subject and to generate a nutritional plan for the subject. Developing a weight loss plan and a nutritional plan are discussed below with reference to the SCHOLASTIC menu option. The subject who is a student athlete will generally obtain an ID and a password from his coach. The coach references each subject's ID and password from the WRESTLER ACCESS menu, which lists all of his team member IDs and passwords.

The EDUCATION option can be used to access nutritional information and access to, for example, an educational video. The educational video may be provided to advise coaches, wrestlers, parents, or other athletes and subjects on basic nutritional principles, hydration, and weight management. The video can include, for example, a review of basic nutritional guidelines, a review of hydration guidelines, recommendations for weight management, and special nutritional topics for certain classes of subjects. For wrestlers, that could include topics such as, for example, pre-competition meals, food and beverage intake during competition, post-competition nutritional guidelines, healthy choices from the school cafeteria, etc. A HELP option may also be provided to provide information on use of the site and for other information.

The SCHOLASTIC menu option is illustrated in FIG. 2B. The INSTRUCTION, EDUCATIONAL, and HELP menu options can contain information similar to the menu options under the COLLEGIATE menu shown in FIG. 2A, and may be tailored to the scholastic side of the website.

The COACHES menu option is provided to allow coaches to enter data regarding subject wrestlers, and to access subject data. The INITIAL ASSESSMENT menu option is used to generate an NWCA Wrestling Weight Certification form. A sample NWCA Wrestling Weight Certification form is illustrated as FIG. 2H. The NWCA form may use calculations similar to the NCAA form illustrated in FIG. 2C, with modifications to account for the different body composition requirements for state or local governing bodies. For example, according to the form shown in FIG. 2H, the minimum allowable body fat percentage is 7%, as opposed to the 5% value shown in the NCAA form. The system 1000 (FIG. 1) can account for national, local and state requirements, and can generate forms that conform to the requirements.

The APPEAL option provides a list of subject wrestlers, and allows a user to select a subject, and to request an appeal of the initial assessment for that wrestler. The ALPHA MASTER menu option is used to generate an NWCA Wrestling Weight Certification Alpha Master Report. A sample NWCA Wrestling Weight Certification Alpha Master Report is illustrated as FIG. 2I. The WEIGHT LOSS PLAN menu option is used to generate a weight loss schedule for a subject. The weight loss schedule provides a list of minimum weights that the subject can have at specified dates, similar to the plan illustrated in FIG. 2F. A sample plan is illustrated as FIG. 2J. The wrestler's actual weight for each time can be entered in the right column. The WRESTLER ACCESS menu option generates a NWCA Wrestling Weight Certification Wrestler Access Report, which may have a format similar to the form shown in FIG. 2G.

The ASSESSORS menu option is used to allow a designated assessor to enter information in the system and to view information. The assessor is typically a person authorized by a governing body to monitor the weight status of one or more subjects. The assessor may also be authorized to enter data and to generate reports. The INITIAL ASSESSMENT option, the APPEAL option, the ALPHA MASTER option, and the WEIGHT LOSS PLAN option may all have functions for assessors similar to the same functions under the COACH menus. In a state without a mandatory program, a subject's coach can usually perform one or more assessor tasks.

The STUDENT ATHLETES menu option provides a subject student athlete access to his data, and generates a menu of food items that the subject can consume while conforming to the weight loss plan. The VIEW ASSESSMENT option allows the subject to view his initial assessment (see FIG. 2H). The WEIGHT LOSS PLAN option allows the wrestler to view his weight loss plan (see FIG. 2J). From the WEIGHT LOSS PLAN menu, the subject can generate a nutritional plan that conforms to the plan. Generating a nutritional plan using the website arrangement is discussed below with reference to FIGS. 3A-3K

According to an embodiment of the present invention, a nutrition plan is generated for a subject. FIGS. 3A-3K illustrate one method for generating a nutrition plan for a subject. The method illustrated in FIGS. 3A-3K can be executed by accessing either the COLLEGIATE menu option or the SCHOLASTIC menu option. The nutrition plan can be selected to conform to the weight plan generated in the method described above, and with other factors. According to a preferred embodiment, a nutritional plan based on the weight loss plan is generated by the system 1000. The nutritional plan allows subjects, and in particular wrestlers, to select from a wide variety of food products from a variety of lists based upon, for example, their fat free weight (which may be calculated in the certification program), their resting metabolic rate, and their typical daily activity level. This information may be used to calculate a number of "choices" each wrestler can select from each list of food items (vegetables, meats, etc). The nutritional plan can be a dynamic dietary plan, which a user and/or subject can modify at any time, as long as the nutrition plan requirements are satisfied. While this invention is particularly adaptable to wrestlers, the same method or a similar method can be employed by many types of subjects for monitoring their weight and/or nutrition.

Figure 3A:
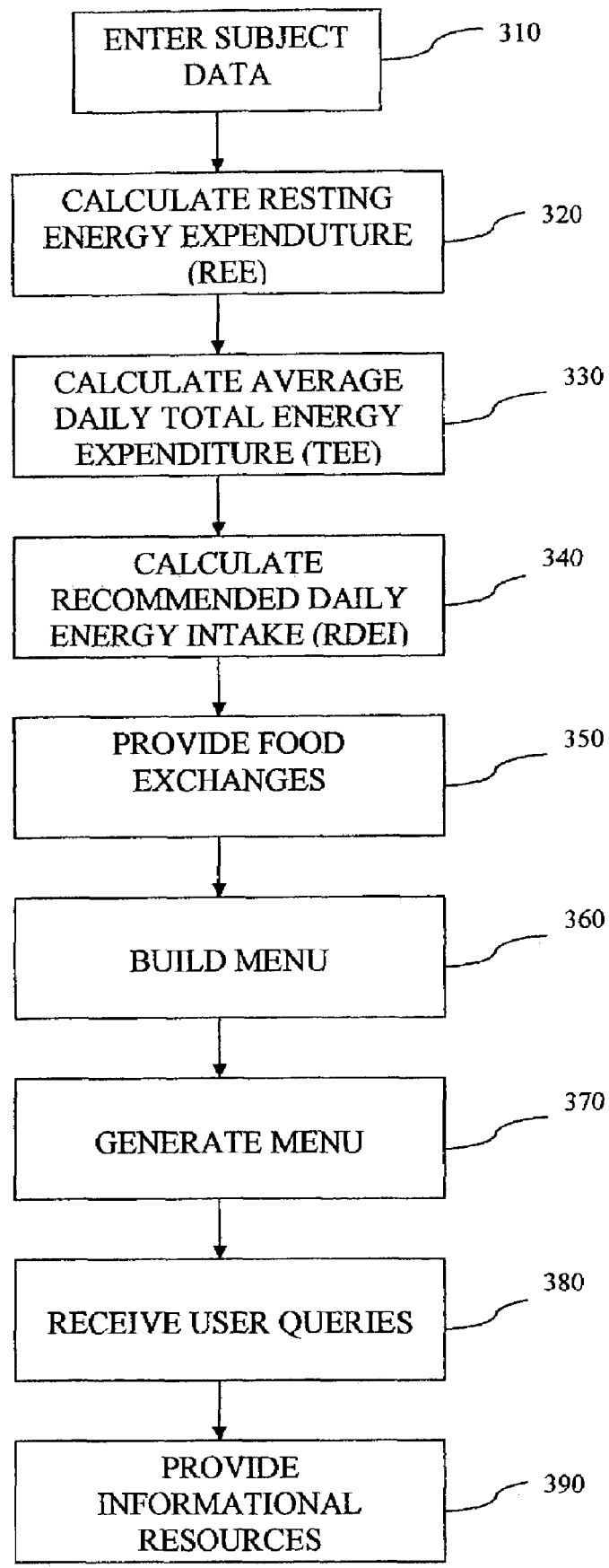
FIG. 3A illustrates a method for generating a nutrition plan.

FIG. 3A is a block diagram of a method for generating a nutritional plan for a subject. FIGS. 3B-3K illustrate various displays used in executing the method.

In step 310, the user, who will typically be the subject, enters personal data such as age, height, and activity level (see steps 1-3 in FIG. 3B).

In step 320, a resting energy expenditure (REE) (using a fat-free mass based equation) is calculated.

In step 330, an average daily total energy expenditure (TEE) (using the Bouchard system of energy equivalents for 24-hour grouped activities) is calculated.

Figure 3C:

In step 340, a recommended daily energy intake (RDEI) is calculated using, for example, an equation based on REE, TEE, and the recommended rate of weight loss. RDEI can be based on factors such as resting metabolic rate, physical activity levels, and body composition. The Institute of Medicine has published a formula suitable for calculating RDEI. FIG. 3C illustrates sample calculated values for TEE and RDEI.

In step 350, a recommended number of food exchanges are provided. A "food exchange" is a selection of food selectable by the subject. The food exchanges may be provided for all food groups, and may be based on the RDEI and nutritional guidelines for a healthy diet (e.g., based on a 55% carbohydrate, 30% fat, and 15% protein macronutrient profile). A sample Food Exchange Options screen is illustrated in FIG. 3D.

In step 360, a series of prompts are provided to allow the subject to build a menu. The menu items may be selected according to the subject's personal likes/dislikes. The menu is built to facilitate weight loss at the prescribed rate. Menu items are selected according to prescribed serving sizes and food exchange type. Examples of food exchanges are nonfat dairy, lean protein, vegetables, fruit, starches, and an "extra calories" menu. FIGS. 3E-3J illustrate the entry screens for entering the subject's food exchange options and amounts. As an alternative to allowing the subject to build a menu from scratch, sample menus can be provided that the athlete/coach can adapt to meet specific needs.

In step 370, the subject's menu is generated. A completed sample menu is illustrated in FIG. 3K.

In step 380, queries may be received by the subject. The subject can submit queries to one or more qualified nutritional advisors, such as, for example, a registered dietitian.

In step 390, informational resources are provided. The subject is allowed to access other informational web sites providing advice on nutritional guidelines. Several websites exist that provide advice to wrestlers, for example, and URLs for these websites may be presented in a menu.

Figures 4, 5, 6:
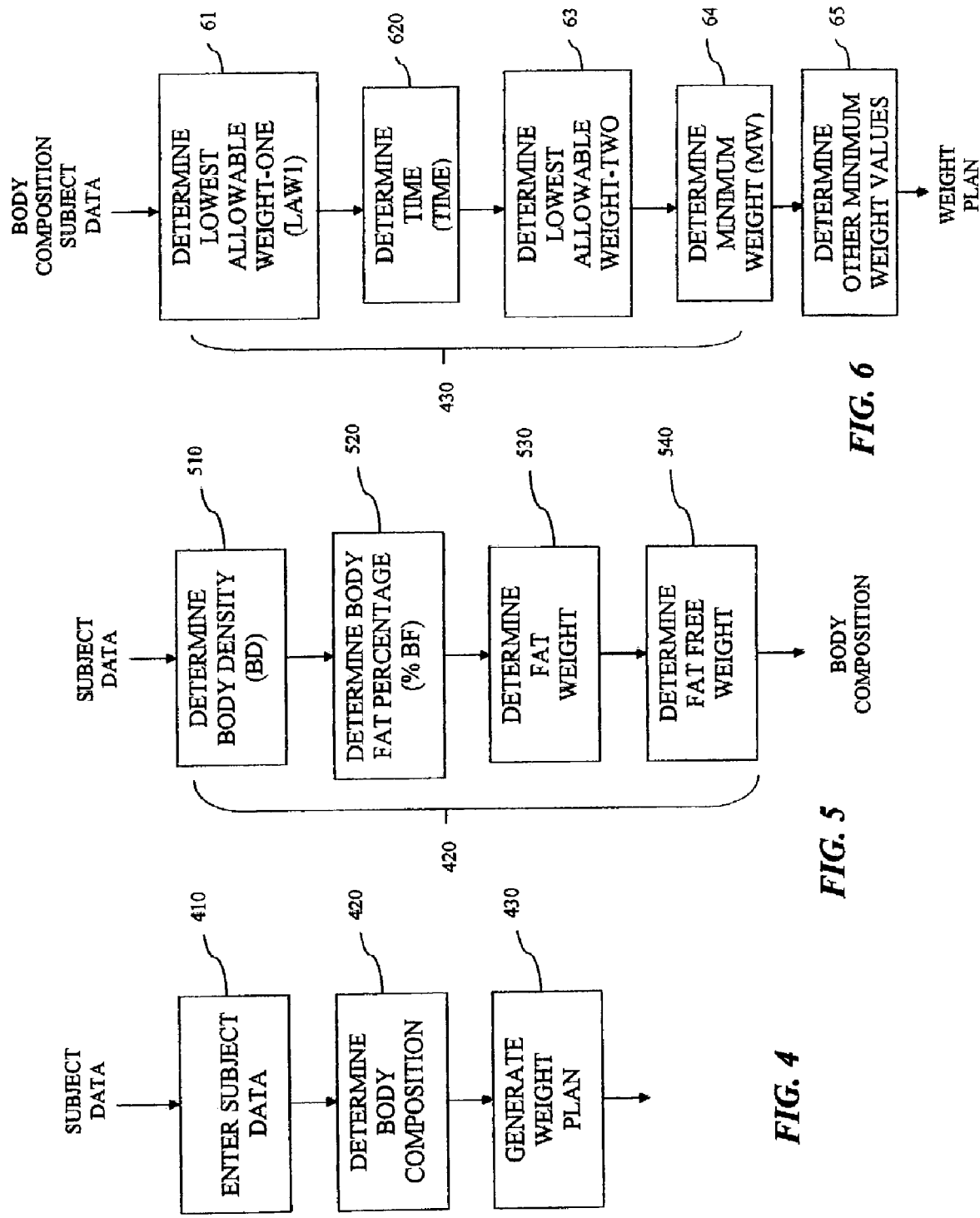
FIG. 4 illustrates a method for generating a weight plan.
FIG. 5 illustrates a method for determining a subject's body composition in accordance with the method shown in FIG. 4.
FIG. 6 illustrates a method for generating a weight plan in accordance with the method shown in FIG. 4.

A method of generating a weight plan will now be discussed with reference to FIGS. 4-6. FIG. 4 is a block diagram of the method for generating a weight plan. In one embodiment, the method is executed by the system 1000 illustrated in FIG. 1. Other apparatuses, however, may be used to employ the method. The method can be used to generate the weight plans discussed above (see FIGS. 2F and 2J).

The method is discussed in the context of a subject wrestler operating under guidelines from a governing authority, such as, for example, the NCAA, or a state's athletic association. A user may, however, enter data for subjects engaging in other activities, such as monitoring weight for general health or other reasons. The guidelines can therefore be applicable at the collegiate level or at the secondary school level.

Many organizations govern athletics at various levels. At the collegiate level, the National Association of Intercollegiate Athletics (NAIA) and the National Collegiate Athletic Association (NCAA) determine the requirements for athletes. Standards for scholastic athletes are determined by state and local high school athletic associations. In this specification, these organizations are referred to by the generic term "governing body." More than one governing body may have jurisdiction over a subject.

In general, governing bodies require wrestlers to have their body fat percentage (% BF) and body weight (BW) determined before the wrestling season begins. In FIG. 4, this step is disclosed as step 410, in which subject data is entered. The data can be entered on a form such as those illustrated in FIGS. 2C, 2D, and 2H. The subject's body weight BW is preferably measured when the subject is hydrated. The body weight (BW) may therefore be referred to as a "hydrated body weight" or, more generally, a "current weight." This step may also include the entry of raw data such as body caliper measurements used to determine the subject's body fat percentage (% BF). Alternatively, the subject's body fat percentage may be entered directly. Body fat percentage can be provided by, for example, a commercially available service such as BodPod®. Other subject data entered at this point can include the alpha date, urine specific gravity, subject grade or years in college, and subject name.

In step 420, the subject's body composition is determined. The subject's body composition can include data such as the subject's body density (BD), body fat percentage (% BF), fat weight (FW), and fat free weight (FFW). These values may be displayed on the forms illustrated in FIGS. 2C, 2D, and 2H. The steps involved in determining the subject's body composition are discussed in detail with reference to FIG. 5.

In step 430, the subject's weight plan is generated. The weight plan can include one or more weight parameters such as, for example, a lowest allowable weight (lowest allowable weight-one, or "LAW 1") at which a wrestler can wrestle at for a first time period T1. In more general terms, LAW 1 can be a lowest recommended weight for a first time period. The weight parameters can also include a lowest allowable weight-two (LAW 2). LAW 2 can be a lowest allowable weight for a subsequent or later time period T2. LAW 2 is typically used to describe a minimum ending weight after a period of weeks. In addition, minimum weights for any number of intermediate time periods, such as weekly time periods, can be calculated. As shown in FIGS. 2F and 2J, each time period in the left hand column is accompanied by a minimum weight for that time. The minimum weights may be used to inform the subject, coaches, parents, or others, of the minimum weight that the subject should have at any time. Generation of a weight plan is discussed in detail below with reference to FIG. 6.

After the weight plan is generated, the subject's weight may be monitored. In one embodiment, users, who may be wrestling coaches, are capable of monitoring any number of subjects' compliance with prescribed governing body guidelines. The website arrangement described above is particularly advantageous for monitoring the subject's compliance because of the detailed reports available to users. For example, each wrestling coach in a specified region can have access to the server 1010, and can monitor any of the wrestlers participating in wrestling in that region. According to NCAA guidelines, for example, if a certain wrestler is below his/her allowable body weight for a given week, he/she is not allowed to wrestle. A coach or other user who detects that a wrestler is not operating within the prescribed guidelines can alert the governing authority of detected violations. In addition to and alternatively to monitoring by users, the server 1010 may contain a database of subject data, and the subject data can be examined to determine whether the subject is complying with the prescribed guidelines. In this way, the system 1000 can provide automatic notification when a subject fails to comply with prescribed guidelines.

As another advantage to using the web-based application, the data entry and calculations used in the initial assessment can be used to generate a weight certification form, which may be in a form acceptable to the various governing bodies. The weight certification form may be submitted to a governing authority, such as the NCAA, or the state's athletic association. The report establishes the wrestler's minimum allowable wrestling weight, and accordingly his/her lowest allowable wrestling class. These calculations are based on a formula supplied by the NCAA.

FIG. 5 is a block diagram of a method of determining a subject's body composition. The method steps illustrated in FIG. 5 correspond to step 420 in FIG. 4.

In step 510, the subject's body density (BD) is determined. Body density may be determined by a number of methods. For example, data from skin-fold measurements may be used to calculate body density. One skin-fold measurement technique involves skin-fold measurements taken in three areas of the body: triceps, subscapular and abdominal. The skin-fold measurements can be entered as subject data in step 410 (FIG. 4). The median values of each area are then summed, and used in the following formula to determine BD:

$$BD = [1.0982 - ((SUM\ SF) * 0.000815)] + [(SUM\ SF)^2 * (0.00000084)]$$

where SUM SF is the sum of the skin-fold median values. Alternatively, body density may be measured by known methods such as hydrostatic weighing or commercial devices such as BodPod®, as discussed above.

In step 520, the subject's body fat percentage is calculated. Body fat percentage (% BF) can be calculated according to the following formula:

$$\%\ BF = [(4.57/BD) - 4.142] * 100.$$

In step 530, the subject's fat weight (FW) is calculated. Fat weight is the weight of the fat contained in the subject's body. Fat weight may be calculated according to the following formula:

$$FW = BW * (\%\ BF/100).$$

In step 540, the subject's fat free weight (FFW) is calculated. The fat free weight FFW represents the weight of a subject's body that is comprised of materials other than fat, and may be calculated according to the following formula:

$$FFW = BW - FW.$$

FIG. 6 illustrates a method of determining a weight plan. The steps illustrated in FIG. 6 correspond to step 430 in FIG. 4.

In step 610, a lowest allowable weight-one (LAW 1) is calculated. The lowest allowable weight-one is calculated according to the FFW. LAW 1 can be calculated according to:

$$LAW\ 1 = FFW/f$$

In the equation for LAW 1, f is a factor that describes the minimum body fat allowed according to governing body rules. For NCAA standards, a minimum body fat of 5% is required. For the NCAA, f is 0.95, or 1.00–0.05. For other governing bodies, such as those that regulate high school wrestlers, f can be, for example, 0.93.

In step 620, a time period (TIME) is determined. The time period can be described as a period of time between an initial assessment and a "deadline date," and is usually described as a number of discrete time periods of weeks. The deadline date represents a deadline measurement date. The deadline measurement date is different according to different governing bodies. For example, in NCAA collegiate wrestling, the deadline date is December 15$^{th}$.

The time period TIME can be, for example, expressed as a number of discrete time periods, such as weeks ("WEEKS") between the initial assessment and deadline date. The deadline date can be any date. The various state athletic associations may specify other dates.

In step 630, a lowest allowable weight-two (LAW 2) is determined. LAW 2 may be calculated according to the general formula:

$$LAW\ 2 = BW - (BW * c * TIME)$$

where c is a constant. In a more specific embodiment, and in accordance with NCAA guidelines limiting body weight loss to 1.5% of body weight per week (i.e., c=0.015), the formula can be stated as:

$$LAW\ 2 = BW - (BW * 0.015 * TIME)$$

where TIME is in units of weeks.

In step 650, a minimum weight (MW) is determined. The Minimum Weight may be calculated according to the following formula:

$$MW = \text{the higher of LAW 1 and LAW 2.}$$

If the subject is a wrestler, the minimum weight can be described as the subject's minimum wrestling weight (MWW), and may be calculated by:

$$MWW = \text{higher of LAW 1 and LAW 2.}$$

The minimum wrestling weight MWW is the minimum weight that a wrestler may have and still conform to governing body standards. Each time period during the monitoring period for a subject has its own MWW.

In step 650, minimum weight values for each of the discrete times in the measurement period may be calculated, as are illustrated in FIGS. 2F and 2J. The minimum weights can be calculated by reducing the alpha or initial body weight assessment by a percentage prescribed by a governing body. Reducing each preceding projected minimum weight by the percentage populates the projected weight fields in FIGS. 2F and 2J.

NWCA currently supports an Internet-based weight certification program for the calculation of a safe and healthy minimal wrestling weight.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents. As used herein and in the following claims, articles such as "the", "a" and "an" can connote the singular or plural.

We claim:

1. A method of conducting a weight and nutritional program over a network, comprising:
   providing a menu of data entry options on a user access port connected to the network, at least one of the data entry options allowing entry of data for generating an assessment of a subject;
   generating a weight plan on a server connected to the network based on the subject assessment data, the weight plan including a plurality of minimum weights for the subject, each of the minimum weights being associated with a time; and
   generating a nutritional plan based on the subject data entered, wherein generating the nutrition plan comprises:
   providing a series of food exchange item displays to the user;
   receiving food exchange item selections from the user; and
   generating a nutritional plan based on the selections;
   further wherein generating the weight plan comprises:
   determining a first minimum weight using the subject's body weight, body fat percentage, and fat weight;
   iteratively decreasing the first minimum weight by a constant factor, each successive decrease in the first minimum weight corresponding to a successive minimum weight for a successive time period; and
   monitoring the subject's weight over the network.

2. The method of claim 1, wherein the body fat percentage is calculated as [4.57/body density−4.142]*100.

3. The method of claim 1, wherein fat weight is calculated as: [subject's body weight*(body fat percentage/100)].

4. The method of claim 1, wherein the first minimum weight value is calculated as the larger of: [(fat free weight/f) and ((subject's body weight)−(subject's body weight*c*time))])], where f is a factor that describes the minimum body fat allowed and c is a constant that describes the maximum body weight loss per time period as a factor of body weight.

5. The method of claim 1, wherein monitoring the subject's weight over the network further comprises determining compliance with the weight plan.

6. The method of claim 5, wherein determining compliance with the weight plan further comprises checking that the subject's weight is in accordance with predetermined guidelines.

7. The method of claim 6, wherein the predetermined guidelines are established by at least one of the National Collegiate Athletic Association and the National Association of Intercollegiate Athletics.

8. A method of conducting a weight and nutritional program over a network, comprising:
   providing a menu of data entry options on a user access port connected to the network, at least one of the data entry options allowing entry of data for generating an assessment of a subject;
   generating a weight plan on a server connected to the network based on the subject assessment data, the weight plan including a plurality of minimum weights for the subject, each of the minimum weights being associated with a time; and
   generating a nutritional plan based on the subject data entered, wherein generating the nutrition plan comprises:
   providing a series of food exchange item displays to the user;

receiving food exchange item selections from the user; and generating a nutritional plan based on the selections, wherein the network is one of the Internet or an intranet, and wherein generating a weight plan comprises:

receiving an input of the subject's weight;

determining the subject's body fat percentage;

calculating a lowest allowable weight-one based at least in part on the subject's body fat percentage;

determining a plurality of minimum weight values based on the calculated lowest allowable weight-one, each minimum weight value being associated with a time; and monitoring the subject's weight over the network.

9. The method of claim 8, wherein calculating a lowest allowable weight-one comprises:

determining the subject's fat weight;

determining the subject's fat free weight;

multiplying the subject's body weight by the body fat percentage to calculate the fat weight;

subtracting the fat weight from the body weight to calculate the fat free weight; and dividing the fat free weight by a factor.

10. The method of claim 8, wherein determining the subject's body fat percentage comprises:

determining the subject's hydrated weight; and determining the subject's body density.

11. The method of claim 8, wherein the subject is allowed to lose a preselected percentage of his body weight in a discrete time period, the preselected percentage being mandated by a governing body.

12. The method of claim 8, wherein body fat percentage is calculated as: $[4.57/\text{body density})-4.142]*100$.

13. The method of claim 8, wherein body fat weight is calculated as: $[\text{subject's weight}*(\text{body fat percentage}/100)]$.

14. The method of claim 8, wherein the first minimum weight value is calculated as the larger of: $[(\text{fat free weight}/f)$ and $((\text{subject's body weight})-(\text{subject's body weight}*c*\text{time}))]$, where f is a factor that describes the minimum body fat allowed and c is a constant that describes the maximum body weight loss per time period as a factor of body weight.

15. The method of claim 8, wherein monitoring the subject's weight over the network further comprises determining compliance with the weight plan.

16. The method of claim 15, wherein determining compliance with the weight plan further comprises confirming that the subject's weight is in accordance with predetermined guidelines.

17. The method of claim 16, wherein the predetermined guidelines are established by at least one of the National Collegiate Athletic Association and the National Association of Intercollegiate Athletics.

18. A method for complying with predetermined guidelines for monitoring the weight of a subject comprising:

providing a means of data entry options on a user access port connected to the network, at least one of the data entry options allowing entry of data for generating an assessment of a subject;

determining the subject's body weight based on the subject data entered;

determining the subject's body fat percentage based on the subject data entered;

multiplying the subject's body weight by the body fat percentage to calculate the fat weight;

subtracting the calculated fat weight from the body weight to calculate the fat free weight;

dividing the fat free weight by a factor;

determining a first minimum weight value using the subject's body weight, body fat percentage, and fat weight;

iteratively decreasing the first minimum weight value by a constant factor, each successive decrease in the first minimum weight corresponding to a successive minimum weight for a successive time period; and transmitting one or more values determined in said method over a network in a form to comply with said predetermined guidelines.

19. The method of claim 18, wherein said predetermined guidelines are established by at least one of the National Collegiate Athletic Association and the National Association of Intercollegiate Athletics.

* * * * *